Feb. 6, 1923.
M. W. KOSKI.
NUT LOCK.
FILED JAN. 23, 1922.
1,443,992
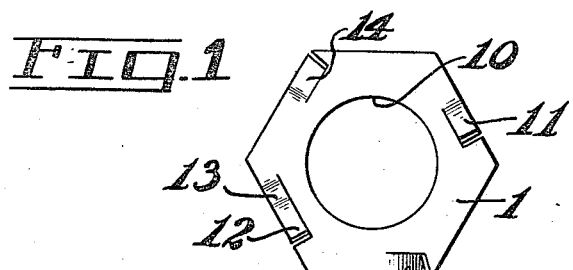
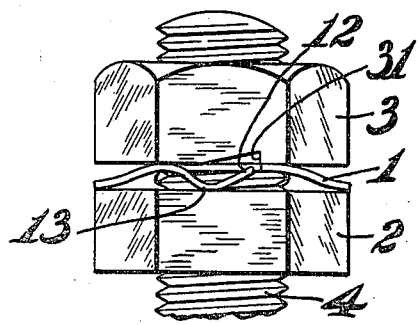 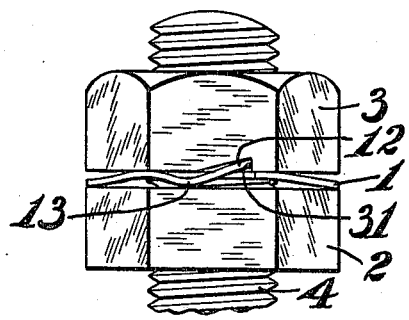
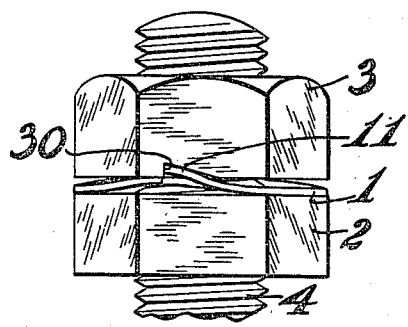 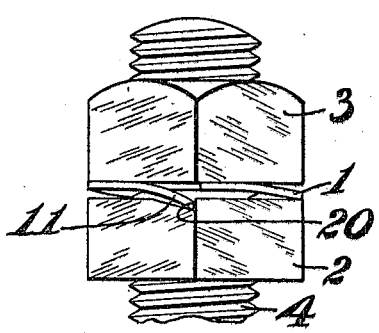
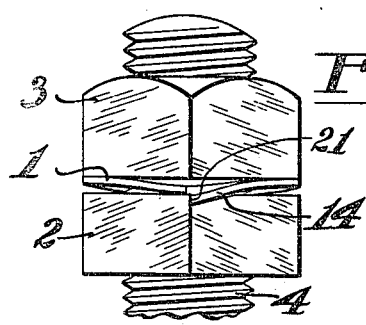
Inventor
Matt William Koski
By N. L. & S. L. Reynolds
Attorneys Patented Feb. 6, 1923.

1,443,992

UNITED STATES PATENT OFFICE.

MATT WILLIAM KOSKI, OF RAYMOND, WASHINGTON.

NUT LOCK.

Application filed January 23, 1922. Serial No. 531,156.

*To all whom it may concern:*

Be it known that I, MATT WILLIAM KOSKI, a citizen of the United States of America, and resident of the city of Raymond, in the county of Pacific and State of Washington, have invented certain new and useful Improvements in Nut Locks, of which the following is a specification.

My invention relates to nut locks and has for its principal object the provision of a nut lock which will hold firmly and yet which may be removed whenever it is desired to do so.

A further object is to provide a nut lock which is simple in construction, cheap to make, and reliable in its holding action.

My invention comprises those novel parts and combinations thereof which are shown in the accompanying drawings, described in the specification, and particularly defined by the claims terminating the same.

In the accompanying drawings I have shown my invention in the form which is now preferred by me.

Figure 1 is a top plan view of the lock washer forming a part of my invention.

Figure 2 is a side elevation of the holding nut, the lock nut and the lock washer, which together constitute my invention, parts being shown in a position where the lock nut has not quite been threaded home.

Figure 3 is a view similar to Figure 2, showing the lock nut threaded fully home, parts being shown in the locked position.

Figures 4, 5 and 6 are side elevations of my device in the locking position, showing the various ratchet and holding elements.

My invention contemplates the use of a holding nut 2 and a lock nut 3, both of which are intended to thread upon an ordinary bolt 4, and in connection with these nuts, means for preventing relative rotation thereof in such direction as to permit axial separation thereof and also means for preventing rotation in the opposite direction, that is, in that direction which causes one nut to approach the other, beyond a certain predetermined point.

The ratchet means which will prevent unscrewing of the lock nut 3 and its axial separation from the holding nut 2, I have shown as combined in a single element with the member which prevents too close approach of the nuts 3 and 2. I have shown a lock washer 1 having a central opening 10 which is intended to fit about the bolt 4 and to slide thereupon, this washer 1 being interposed between the nuts 2 and 3. The nuts 2 and 3 are each provided with shoulders or ratchet teeth 20 or 30 as the case may be, facing oppositely upon the two opposite nuts and engageable by pawls 11 formed upon the washer 1. These pawls 11 may be cut out and sprung from the washer 1, which is preferably of spring material or of a spring-like character, and upon approach of the nuts 3 and 2 the pawls 11 engaging the shoulders 20 and 30 will prevent reverse or unscrewing rotation of the nuts.

I also provide a holding pawl 14 upon the lock washer, this pawl facing oppositely to the ratchet pawl 11 on the washer which engages the same nut as this holding pawl 14. This pawl 14 will engage a shoulder 21, for instance upon the nut 2, and when so engaged will prevent rotation of the washer 1 in the same direction as the lock nut 3 which is being threaded on.

I have shown the means for preventing too close approach of the nuts as combined in a unit with the lock washer 1. The washer 1 is provided with a tooth having a holding point 12 which is normally depressed beneath the surface of the washer 1 but which is projectable toward one or the other of the nuts 2 or 3, being the one opposite that with which the pawl 14 is engaged. One of these nuts, shown herein as the lock nut 3, is provided with a shoulder 31 which may be engaged by the point 12 of the tooth. This tooth also has a heel portion 13 which is adapted to be contacted by the other nut 2.

As the two nuts approach each other, the heel 13 bearing upon the nut 2, the nut 3 will pass over the depressed holding point 12. The pawls 11 engaging both nuts 2 and 3 will prevent reverse rotation thereof, and the pawl 14 engaging the nut 2 will prevent advance rotation of the washer 1. As advance rotation of the locknut 3 progresses the pressure of the washer 1 will react through the heel 13 to cause projection of the holding point 12 above the surface of the washer 1. Thus it will eventually engage the shoulder 31, and when so engaged, as is shown in Figure 3, advance rotation, that is rotation in the direction to cause approach of the nuts 3 and 2, will be prevented. The point where such action will take place may be determined by the length and inclination of the point 12 and by the projection of the heel 13. It is immaterial which side of the washer 1 is uppermost, for if it were reversed from the position shown in the drawings the pawl 14 would engage the shoulder 31 and the point 12 would engage the shoulder 21, while the pawls 11 would operate as before, only upon the other nut.

By the means described above and by the use of a washer 1 of spring material, I cause a locking action to take place by reason of the washer 1 forcing the nuts 3 and 2 in opposite directions axially. However, when it is desired to remove the nuts by engaging both simultaneously with a wrench, the two may be turned backwardly upon the bolt 4 and in this manner, carrying the washer 1 with them, they may be removed. The nuts 2 and 3 and the washer 1 may then be separated. As the washer is made preferably of spring material, the holding point 12 will again fall beneath the surface of the washer 1, and it may be used again. The success of my device depends upon the provision of means which will prevent such close approach of the nuts 3 and 2 as will cause too tight a binding action upon the threads of the bolt 4. The binding action provided by the spring of the washer 1 is sufficient for most uses, and yet is not too great to prevent unscrewing of the nuts together.

What I claim as my invention is:

1. In a nut lock, the combination of a holding nut and a lock nut, of means interengageable between said nuts to prevent their relative rotation in a direction to separate them axially, and resilient, normally inoperative means operable by approach of said nuts to engage said nuts to prevent relative rotation thereof in a direction to cause their approach axially beyond a predetermined point.

2. In a nut lock, the combination of a holding nut, a lock nut, and a lock washer interposed between said nuts, said washer having ratchet means engageable with cooperating means provided upon each of said nuts to prevent relative rotation of the nuts in a direction to separate them axially, and means on said washer normally inoperative, but operable by approach of said nuts to engage one of said nuts to prevent rotation thereof in a direction to cause them to approach each other beyond a predetermined point which is farther apart than the thickness of said washer.

3. In a nut lock, the combination of a holding nut, a lock nut, and a lock washer interposed between said nuts, said washer having ratchet means engageable with cooperating means provided upon each of said nuts to prevent relative rotation of the nuts in a direction to separate them axially, and a normally depressed tooth upon said washer projectable to engage with a shoulder provided upon said lock nut upon the approach of said nuts, to prevent rotation of the lock nut in a direction to cause approach thereof towards the holding nut beyond a predetermined point.

4. In a nut lock, the combination of a holding nut, a lock nut, and a lock washer interposed between said nuts, said washer having ratchet means engageable with cooperating means provided upon each of said nuts to prevent relative rotation of the nuts in a direction to separate them axially, and a tooth upon said washer having its holding point normally depressed below the washer's surface and having a heel projecting towards and engageable by one of said nuts upon their approach, whereby the holding point is projected towards the other nut, said latter nut having a shoulder engageable by said holding point to prevent relative rotation of the nuts in a direction to cause their approach beyond a predetermined point.

Signed at Raymond, Pacific County, Washington, this 14th day of January, 1922.

MATT WILLIAM KOSKI.